UNITED STATES PATENT OFFICE.

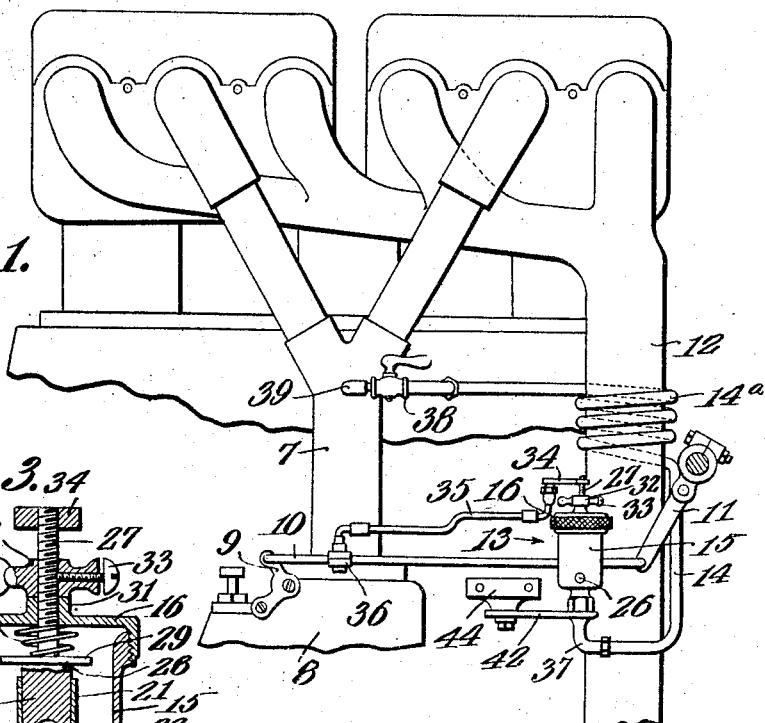

JOHN W. FUDGE, OF MARION, INDIANA.

AIR-ACCELERATOR.

1,125,302.

Specification of Letters Patent.

Patented Jan. 19, 1915.

Application filed December 28, 1912. Serial No. 739,095.

*To all whom it may concern:*

Be it known that I, JOHN W. FUDGE, a citizen of the United States, residing at Marion, in the county of Grant and State of Indiana, have invented a new and useful Air-Accelerator, of which the following is a specification.

The present invention appertains to what may be termed an air accelerator, or to an inspirator for introducing heated air into the intake manifold of an internal combustion engine.

This invention contemplates the production of an attachment for various internal combustion engines, such as automobile, marine, and stationary engines, in order to supply air to the intake manifold and in order that the air supplied to the intake manifold may be throttled according to the throttling of the mixture proceeding from the carbureter.

It is a further object of the present invention to provide an air inlet valve which may be operatively connected to any suitable part of the throttling mechanism for the combustible mixture, and which may be connected to the intake manifold through the medium of a tube or pipe, a portion of which may be disposed contiguous to or coiled around the exhaust manifold so as to heat the air supplied to the intake manifold.

It is also the object of the present invention to provide an air valve which shall be adjustable so as to regulate the passage therethrough when the valve is open, thus permitting the auxiliary supply of air introduced into the intake manifold to be regulated to a nicety.

The present invention also aims to introduce the auxiliary supply of air to the intake manifold in such manner as to break up the mixture passing through the intake manifold from the carbureter, the auxiliary supply of air being drawn into the intake manifold by the suction created by the piston or pistons and commingling with the mixture proceeding from the carbureter so as to provide a final mixture of high quality or efficiency.

The invention has for a further object, to improve generally and to increase the utility of devices of that character to which the present invention appertains.

To the above and other ends, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

The invention is illustrated in its preferred embodiment in the accompanying drawings, wherein:—

Figure 1 is a fragmental side elevation of an internal combustion engine, showing the present invention applied thereto. Fig. 2 is a fragmental plan view of the attachment. Fig. 3 is a vertical central section of the air valve. Fig. 4 is a sectional view on the line 4—4 of Fig. 3. Fig. 5 is a fragmental detail. Fig. 6 is a plan view of the nozzle which is attachable to the intake manifold for introducing the auxiliary supply of air thereinto.

Referring specifically to the drawings, the numeral 7 designates the intake manifold which extends from the carbureter 8 to the cylinders, the mixture proceeding from the carbureter being controlled by the throttle lever 9. To the throttle lever 9 is connected the throttle rod 10, which in turn, is connected to a suitable lever 11 that is adapted to be actuated by the operator in a manner well known in the art. The numeral 12 designates the exhaust manifold or conduit. The foregoing parts may be of any prevailing styles, it being understood that the present device is applicable to various motors or internal combustion engines.

The present attachment embodies in its essentials, an air valve 13 actuated by the throttling rod 10 or any other part of the throttling mechanism for the mixture passing into the intake manifold, in connection with a tube or pipe 14 connecting the air valve and the intake manifold. The air valve comprises a cup or receptacle 15 providing an air chamber, and closed by a cap or cover 16, the bottom of the cup having a central depending boss 17, the periphery of which is hexagonal or polygonal to readily accommodate a wrench or other implement. The cup and its cap form a body or frame for the valve. A nipple 18 depends from the boss 17, and the duct or vent 19 of the nipple extends through the boss 17 to the bottom of the cup, the bottom of the cup being provided with a socket or counterbore 20 at the inner end of the duct. A tubular member or plug socket 21 has its lower end seated or secured within the socket 20, and is provided with an opening or port 22 in one side. A circular plug or spigot 23 fits snugly within the tubular member 21 and is provided with a downwardly opening passage 24 and a lateral port 25 leading from the passage 24 and adapted to be brought into and out of registration with the opening 22. The cup 15 is provided with a pair of diametrically opposite inlet apertures or openings 26 adjacent its lower end or bottom. The plug 23 is also provided with the reduced stem 27 projecting from its upper end and forming a shoulder 28, a washer 29 being disposed on the stem 27 and seating on the shoulder 28. The coiled wire spring 30 surrounds the stem 27 and is compressibly disposed between the washer 29 and the cap 16 so as to give a downward tension to the plug 23. The stem 27 passes through the cap 16, the cap being provided with an upstanding collar or boss 31 embracing the stem loosely, and a hand nut 32 being screw-threaded on the stem 27 to seat on the collar or boss 31. The nut 32 carries a set screw 33 for maintaining it in position.

In order to operatively connect the air valve to the throttling mechanism, the lever 34 is secured to the upper end of the stem 27, and a link 35 is loosely connected to the lever 34 and is also loosely connected to a clamp 36 embracing the throttling rod 10. It is to be understood, however, that the lever 34 may be operatively connected to any other part of the throttling mechanism so as to rotate the plug 23 as the throttling mechanism is adjusted. It is also apparent, that the lever 34 may be so adjusted relative to the plug 23, and that the cup 15 may be properly adjusted relative to the plug, in order that when the plug is rotated due to the movement of the throttling mechanism, the port 25 will be brought into and out of registration with the opening 22. Thus, when the throttling mechanism is advanced, the port 25 should be gradually brought into registration with the opening 22, and conversely, when the throttling mechanism is retracted, the port 25 should be brought out of registration with the opening 22 so as to close the air valve.

The end of the pipe or tube 14 is connected to the nipple 18 through the medium of an elbow 37, the pipe 14 being connected to one arm of the elbow and the nipple 18 being screw-threaded into the other arm of the elbow. A portion of the pipe 14 extends contiguous to or is coiled around the exhaust conduit or manifold 12, as indicated at 14ª and the other end of the pipe 14 is connected to a valve 38, which in turn is connected to the injector nozzle 39. This nozzle 39 is in the form of an elbow, although it may be otherwise constructed, and has the nipple 40 projecting from one arm which is adapted to be screw-threaded into the intake manifold, the nipple being provided with a plurality of outlet apertures or perforations 41. Thus, it will be evident that the ends of the pipe 14 may be readily attached to the nozzle 39 and the nipple 18 of the air valve, after the pipe has been suitably coiled around the exhaust manifold or otherwise extended in a contiguous relation therewith, and after the nozzle 39 has been engaged to the intake manifold.

In order to support the air valve from a suitable part of the motor, or any suitable part adjoining the motor, an arm 42 embraces the nipple 18 at one end and is clamped between the boss 17 and the elbow 37, the arm 42 being provided with the longitudinal open slot 43. A base plate 44 is provided with an ear 45 overlapping the arm 42, a bolt or other clamping member 46 being carried by the ear 45 and engaging through the slot 43 so as to clamp the arm 42 and ear together. Thus, the arm 42 may be positioned at any angle about the air valve, and the base plate 44 may be adjusted longitudinally and angularly relative to the arm 42, in order that the base plate may be secured to any suitable part adjoining the air valve so as to effectively maintain the air valve in position. This adjustable bracket for the air valve permits the air valve to be held in any locality or point adjacent the motor, and it will also be manifest that the link 35 may be connected to various parts of various throttling mechanisms and that the nozzle 39 may be readily engaged to various intake manifolds so that the present attachment may be applied to various internal combustion engines with equal propriety, the present device being somewhat elastic in construction.

In operation, it will be noted from the foregoing, that as the mixture supplied to the intake manifold is throttled, the air valve will be correspondingly throttled, so as to admit an auxiliary or supplemental supply of air into the intake manifold. The air is admitted into the cup or receptacle 15 through the apertures 26, from whence it is admitted to the pipe 14 through the ports 22 and 25 as they are brought into registration. The pipe 14 running contiguous to or coiled around the exhaust manifold or conduit causes the auxiliary supply of air to be heated in order that when it is introduced into the intake manifold, it will properly commingle with the mixture proceeding from the carbureter. The auxiliary supply of air being discharged from the apertures of the nozzle, causes the mixture proceeding from the carbureter to be broken up still finer and is accomplished by the carbureter, the auxiliary supply of air commingling and combining with the mixture to provide a final mixture of high quality or efficiency. This extra supply of air to the mixture "livens" the mixture, or increases the efficiency, of the combustion of the fuel, in order that the same amount of work is performed with a smaller quantity of fuel, or in order that an extra or increased amount of work is performed with the same amount of fuel, as heretofore.

As above indicated, the auxiliary air supply is drawn into the intake manifold due to the suction created by the piston or pistons, and in order to adjust the air valve for various motors, or in order to properly "tune" the device, the plug 23 may be adjusted longitudinally by screwing the nut 32 in either direction, so as to either raise the plug or permit same to be forced downwardly through the action of the spring 30. Accordingly, when the plug 23 is permitted to be depressed slightly, the port 25 of the plug will not fully register or coincide with the opening 22, as seen in Fig. 5, and as a result, when the air valve is open, a smaller quantity of air is permitted to flow therethrough. Thus, by the adjustment of the nut 32, it will enable the operator to permit the proper amount or proportion of air to be admitted into the intake manifold for accomplishing the result desired. Thus, the supply of air into the intake manifold or conduit may be made consistent with the quality of the mixture proceeding from the carbureter, so that the resulting mixture will be of maximum efficiency.

The entire auxiliary air supply may be cut off, whenever it is so desired, by means of the valve 38, without any injurious effect to the attachment, and without impairing the operation of the gasolene throttling mechanism.

The terms "gasolene" and "carbureter" as employed in the foregoing description and in the appended claims, are to be taken in their generic sense, so as to include any character of fuel and any form of a fuel mixer

Having thus described the invention, what is claimed as new is:—

1. In an air inspirator, an air valve embodying a cup having an air inlet, a cap for the cup, a tubular member having one end attached to the bottom of the cup and having a port in one side, a plug fitting in the tubular member and having a passage adapted to be brought into and out of registration with the said port and having a stem projecting through the cap, the bottom of the cup having a nipple communicating with the tubular member, actuating means operatively connected to the stem for oscillating the plug, and adjusting means carried by the stem and coöperating with the cap to set the plug longitudinally.

2. In an air inspirator, an air valve embodying a cup having an air inlet therein, a cap for the cup, a tubular member secured at one end to the bottom of the cup and having a port in one side, a plug fitting in the tubular member having a passage adapted to be brought into and out of registration with the said port and having a stem passing through the said cap, yieldable means for forcing the plug downward, adjustable means limiting the downward movement of the plug, the bottom of the cup having coupling means communicating with the tubular member, and actuating means operatively connected to the outer end of the stem for oscillating the plug.

3. In an air inspirator, a valve embodying an air chamber, a plug socket therein having an air inlet port, a plug fitting in the socket and having a passage adapted to be brought into and out of registration with the said port, and having a stem projecting from the chamber, conducting means attached to the air chamber to communicate with the socket, yieldable means disposed between the plug and chamber tending to force the plug into the socket, an adjustable stop mounted on the stem and seatable against the said chamber to limit the movement of the plug, and actuating means operatively connected to the outer end of the stem for oscillating the plug.

4. In an air inspirator, an air valve embodying a cup having an air inlet and having a nipple depending from its bottom, a tubular member having one end secured to the bottom of the cup so as to communicate with the nipple and having a port in one side, a cap for the cup, and a plug in the tubular member and having a reduced stem passing through the cap, and having a downwardly opening passage and a lateral bore adapted to be brought into and out of registration with the aforesaid port, a coiled wire spring compressibly disposed between the plug and cap, an adjustable stop mounted on the stem and seatable on the cap, and actuating means operatively connected to the outer end of the stem for oscillating the plug.

In testimony that I claim the foregoing as my own, I have hereto affixed my signature in the presence of two witnesses.

JOHN W. FUDGE.

Witnesses:
ANNA DREITZLER,
E. F. FERREE.